United States Patent [19]
Plichta et al.

[11] Patent Number: 5,462,818
[45] Date of Patent: Oct. 31, 1995

[54] HIGH TEMPERATURE SODIUM-GRAPHITE ELECTROCHEMICAL CELL

[75] Inventors: Edward J. Plichta, Howell; Wishvender K. Behl, Ocean, both of N.J.

[73] Assignee: The United States of America as represented by the Secretary of the Army, Washington, D.C.

[21] Appl. No.: 336,149

[22] Filed: Nov. 8, 1994

[51] Int. Cl.$^6$ ............................................. H01M 6/30
[52] U.S. Cl. ........................... 429/104; 429/103; 429/105
[58] Field of Search .................... 429/103, 104, 429/105

[56] References Cited

U.S. PATENT DOCUMENTS

| | | | |
|---|---|---|---|
| 3,891,457 | 6/1975 | Auborn | 429/104 |
| 4,069,372 | 1/1978 | Voinov | 429/104 |
| 5,234,778 | 8/1993 | Wright | 429/103 |

*Primary Examiner*—Stephen Kalafut
*Assistant Examiner*—Richard H. Lilley, Jr.
*Attorney, Agent, or Firm*—Michael Zelenka; William H. Anderson

[57] ABSTRACT

An electrochemical cell is provided using graphite immersed in molten $NaAlCl_4$ (mp150° C.) as the cathode, liquid sodium as the anode and β alumina as the sodium ion conducting solid electrolyte to separate the anode and cathode compartments.

4 Claims, 2 Drawing Sheets

HIGH TEMPERATURE SODIUM-GRAPHITE ELECTROCHEMICAL CELL

GOVERNMENT INTEREST

The invention described herein may be manufactured, used, and licensed by or for the Government for governmental purposes without the payment to us of any royalties thereon.

FIELD OF INVENTION

The invention relates in general to high temperature molten salt electrochemical cells and in particular to a high temperature sodium-graphite electrochemical cell.

BACKGROUND OF THE INVENTION

High energy high power rechargeable batteries are made for electric vehicles, weapons, pulse power, and load levelling. Currently used batteries such as the lead acid batteries do not have a high enough energy density.

SUMMARY OF THE INVENTION

The general object of this invention is to provide a high energy, high power rechargeable battery that will provide a high enough energy density, particularly when operated at temperatures of 150° to 200° C.

It has now been found that the aforementioned objects can be attained by providing an electrochemical cell including a liquid sodium metal anode, a $\beta''$-$Al_2O_3$ separator, and a graphite cathode immersed in a molten salt electrolyte of $NaAlCl_4$ and operated at a moderate temperature of about 150° to 200° C.

More particularly, graphite can be used immersed in molten $NaAlCl_4$ (mp:150° C.) as the cathode in cells using liquid sodium metal as the anode and $\beta$- alumina as the sodium ion conducting solid electrolyte to separate the anode and cathode compartments.

DESCRIPTION OF THE DRAWING AND THE PREFERRED EMBODIMENT

Figure 1:
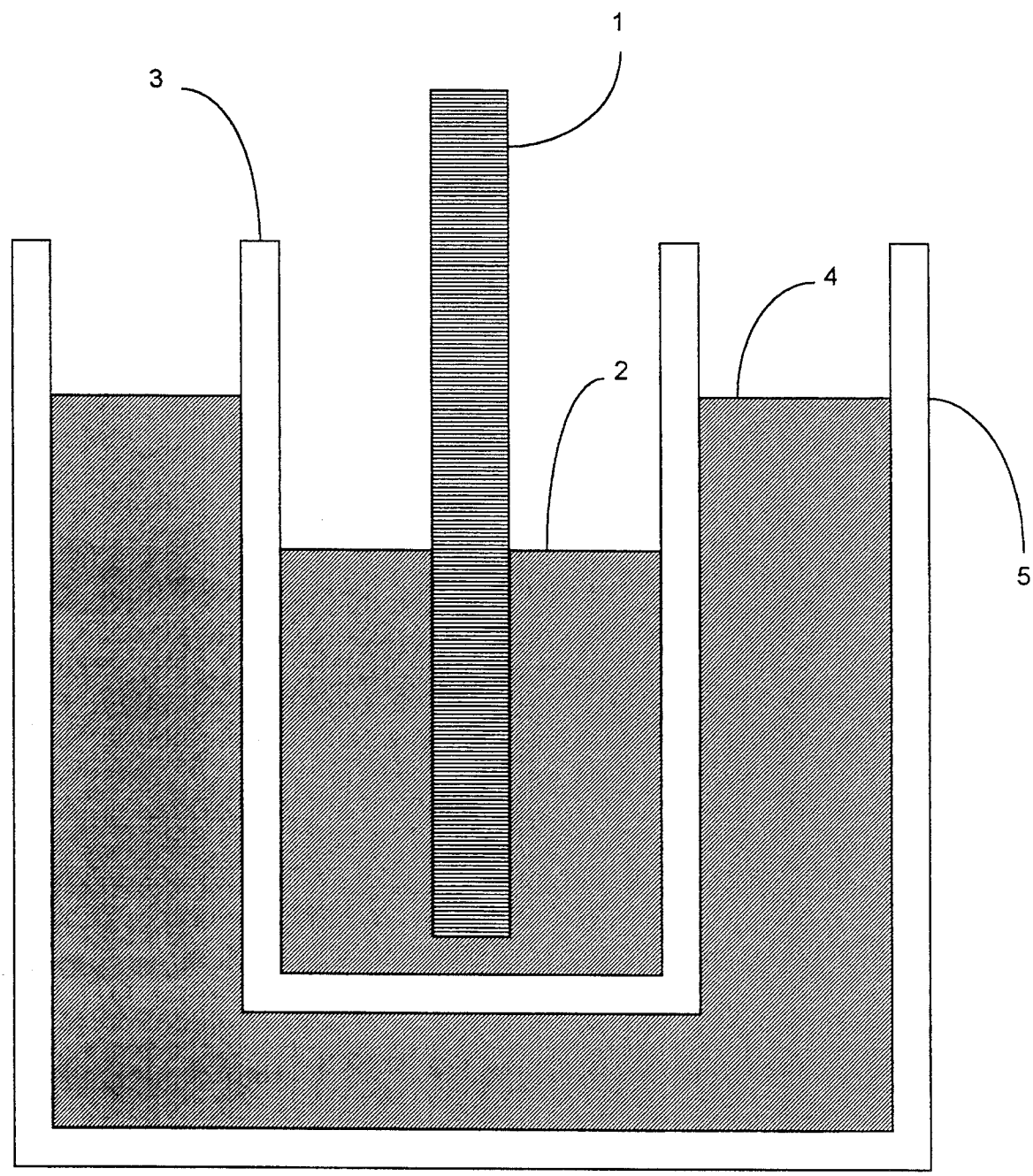
FIG. 1 shows a schematic of the cell design.

Referring to FIG. 1, an 0.31 cm diameter carbon rod, 1, immersed in the catholyte mixture (1.13 g) consisting of 90 wt. % $NaAlCl_4$ and 20 wt. % graphite powder, 2, serves as the cathode current collector. The catholyte mixture is contained in a 10 cm long 0.9 cm diameter $\beta''$-alumina (Ceramatec BT100AOC-1) sealed end solid electrolyte tube, 3, that is immersed in liquid sodium metal (8.4 g), 4, contained in a 2.54 cm diameter stainless steel can, 5, having a length of 4.86 cm and a wall thickness of 0.05 cm. The steel can also serves as the anode current collector. The assembled cell is then sealed into an 8 cm diameter sealed bottom pyrex glass vessel equipped with a threaded Teflon cap having electrical feed throughs and inert gas inlet and outlet fittings. Electrical connections are made between the cell and the feed throughs of the Teflon cap and argon gas is continuously purged through the cell during the galvanostatic cycling. The pyrex vessel is placed in a cylindrical wire-wound furnace and the cell operating temperature controlled at 197° C.

The high temperature sodium-graphite cell may be represented as:

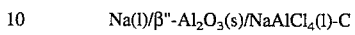

where l and s refer to the liquid or solid state of the cell component. The cell is assembled in the discharged state and the cell reaction on charge is:

where x is equal to or greater than 8. The cell reaction is reversed on discharge. The cell is cycled between the voltage limits of 4.05 V to 2.0 V and exhibits an open circuit potential of 3.3 V in the charged state.

Figure 2:
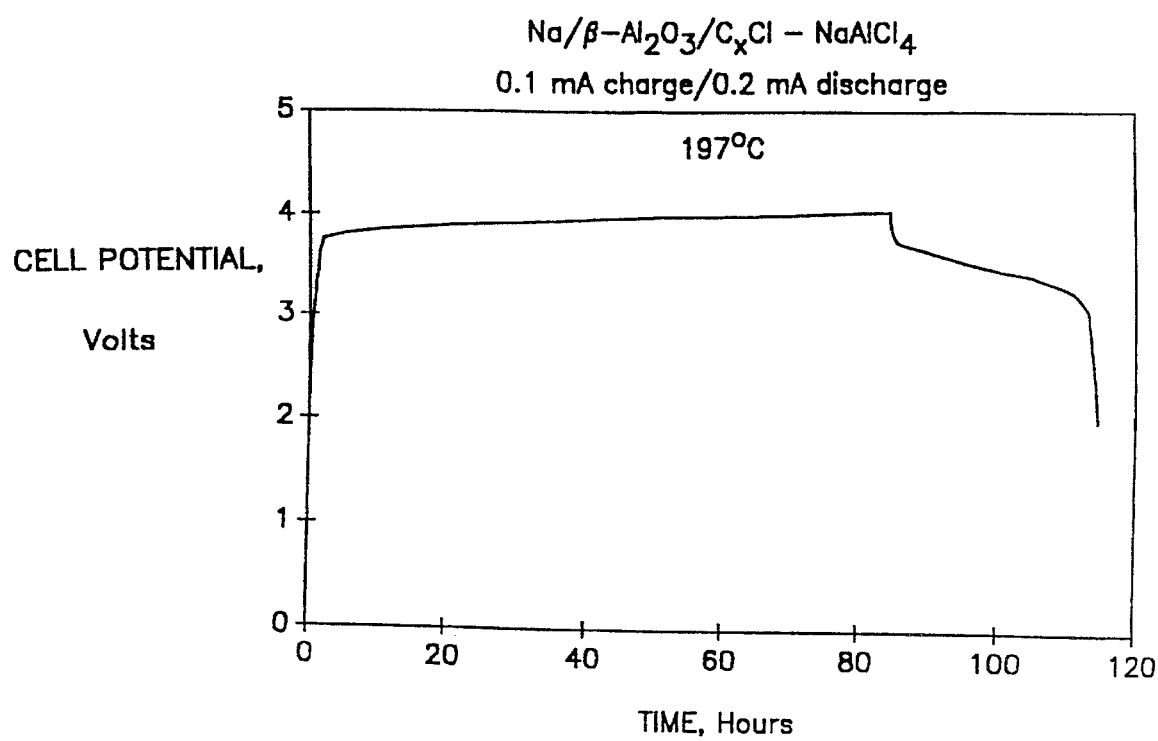
FIG. 2 shows a typical charge-discharge curve for the cell for cycle number 28.

Referring to FIG. 2, the cell is charged at a current density of 0.1 $mA/cm^2$ and discharged at a current density of 0.2 $mA/cm^2$ and exhibits an average voltage of 3.5 V. The cell delivers a capacity of 6 mAh that corresponds to 26.5 mAh/g of graphite in the cathode.

In lieu of sodium metal as the anode, one can use a low melting alloy of sodium as the anode, such as NaPb, NaSn, or NaBi. Any alloy of sodium can be used as long as it is a liquid at the operating temperature of the cell, that is, 150° to 200° C.

We wish it to be understood that we do not desire to be limited to the exact details of construction shown and described for obvious modifications will occur to a person skilled in the art.

What is claimed is:

1. A high temperature electrochemical cell including NaPb as the anode an alkali metal ion conducting solid electrolyte separator, and a mixture of graphite and molten alkali metal tetrachloroaluminate as the cathode.

2. A high temperature electrochemical cell including NaSn as the anode, an alkali metal ion conducting solid electrolyte separator, and a mixture of graphite and molten alkali metal tetrachloroaluminate as the cathode.

3. A high temperature electrochemical cell including NaBi as the anode an alkali metal ion conducting solid electrolyte separator, and a mixture of graphite and molten alkali metal tetrachloroaluminate as the cathode.

4. A high temperature electrochemical cell including a liquid alkali metal containing material selected from the group consisting of liquid sodium and liquid low melting alloys of sodium as the anode, an alkali metal ion conducting solid electrolyte separator and a mixture of graphite and molten alkali metal tetrachloroaluminate as the cathode, and wherein the cathode mixture is 20 weight percent graphite and 80 weight percent molten alkali metal tetrachloroaluminate.

* * * * *